United States Patent [19]

Louzos

[11] 4,267,244
[45] May 12, 1981

[54] LAYERED CHARGE TRANSFER COMPLEX CATHODES OR SOLID ELECTROLYTE CELLS

[75] Inventor: Demetrios V. Louzos, Rocky River, Ohio

[73] Assignee: Union Carbide Corporation, New York, N.Y.

[21] Appl. No.: 134,864

[22] Filed: Mar. 28, 1980

[51] Int. Cl.³ .................................................. H01M 4/36
[52] U.S. Cl. ................................... 429/213; 429/191; 429/199; 429/218
[58] Field of Search ............... 429/101, 103, 213, 212, 429/191, 199, 218, 232; 252/182.1, 502, 512

[56] References Cited

U.S. PATENT DOCUMENTS

| | | | |
|---|---|---|---|
| 3,660,163 | 5/1972 | Moser | 429/213 X |
| 3,660,164 | 5/1972 | Hermann et al. | 429/213 X |
| 4,049,890 | 9/1977 | Schneider | 429/199 X |
| 4,182,798 | 1/1980 | Skarstad | 429/213 |

*Primary Examiner*—Anthony Skapars
*Attorney, Agent, or Firm*—Cornelius F. O'Brien

[57] ABSTRACT

Layered charge transfer complex cathodes for use in solid electrolyte cells wherein one layer of the cathode contains an electronic conductor which is isolated from the cell's solid electrolyte by a second layer of the cathode that does not contain an electronic conductor.

13 Claims, 2 Drawing Figures

LAYERED CHARGE TRANSFER COMPLEX CATHODES OR SOLID ELECTROLYTE CELLS

FIELD OF THE INVENTION

The invention relates to solid state cell systems employing a solid cathode preferably comprising a charge transfer complex cathode in which the complex is the reaction product of at least one halogen with an organic compound.

BACKGROUND OF THE INVENTION

Ionic conductivity is usually associated with the flow of ions through an aqueous solution of metallic salts. In the vast majority of practical uses of ionic conductors, e.g., as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited termperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have ionic conductances approaching those exhibited by the commonly used liquid systems. Such compounds have specific conductances at room temperature (20° C.) in the range of $10^{-6}$ to $10^{-15}$ ohm$^{-1}$ cm$^{-1}$ as compared to aqueous solutions of salts which typically have a specific conductance of 0.5 to 0.05 ohm$^{-1}$ cm$^{-1}$.

Improved microelectronic circuit designs have generally decreased the current requirements for electronic devices. This in turn has enhanced the applicability of solid electrolyte power sources which usually can only deliver currents in the microampere range. These solid electrolyte systems have the inherent advantages of being free of electrolyte leakage and internal gassing problems due to the absence of a liquid phase and corrosion phenomena. In addition, they also have a much longer shelf life than the conventional liquid electrolyte power sources.

Gutman et al, J. Electrochem. Soc., 114, 323 (1967) discloses solid state cells utilizing cathodes of electronically conducting charge transfer complexes and anodes of selected divalent metals. U.S. Pat. No. 3,660,163 disclosed solid state lithium-iodine primary cells employing a lithium anode, a solid state lithium halide electrolyte and a conductive cathode of organic materials, such as polycyclic aromatic compounds, organic polymers, heterocyclic nitrogen-containing compounds, and the like, and iodine. U.S. Pat. No. 3,660,164 discloses solid state cells utilizing as a cathode a charge transfer complex in which the acceptor component is the halogen and the donor component is an organic compound, typically aromatic or heterocyclic.

U.S. patent application Ser. No. 052,846 filed June 28, 1979 discloses a charge transfer complex cathode which is the reaction product of a halogen with carbonaceous pitch, such as mesophase pitch.

As disclosed in U.S. Pat. No. 3,660,163, in a lithium anode cell, lithium iodide can be formed in situ by contacting the lithium anode with the iodine-containing cathode surface whereupon the lithium will react with the iodine in the cathode to form a lithium iodide electrolyte layer that will contact both the anode and the cathode. Alternately, the lithium iodide could be formed by reacting lithium and iodine and then applying the lithium iodide as a coating on the surface of the anode or cathode.

Although various charge transfer complexes will have a conductivity sufficiently high for many applications, some charge transfer complexes will require the addition of an electronic conductor to reduce their resistance for some cell applications. In solid state cell systems that employ a thin layer of a metal halide solid electrolyte in contact with both the anode and cathode, any mechanical disruption of the electrolyte layer may result in the electronically conductive additive directly contacting the anode which would result in the shorting of the cell.

Although various cathode materials have been recited in the art for use in various cell systems, an object of the present invention is to provide a novel layered cathode for use in solid electrolyte cell systems in which one layer contains an electronic conductor and wherein the electronic conductor-containing layer is isolated from the solid electrolyte so as to prevent internal shorting.

Another object of the present invention is to provide a layered cathode comprising a charge transfer complex in which the complex is the reaction product of at least one halogen with an organic compound and wherein one layer contains an electronic conductor.

Another object of the present invention is to provide a layered cathode comprising a charge transfer complex in which the complex is the reaction product of iodine with an organic compound for use in a solid state cell employing a lithium anode and a solid lithium iodide electrolyte.

The foregoing and additional objects will become more fully apparent from the following description.

SUMMARY OF THE INVENTION

The invention relates to a layered cathode for use in solid electrolyte cell systems comprising a charge transfer complex in which the complex is the reaction product of at least one halogen (acceptor) with an organic compound (donor) and wherein an electronic conductor is dispersed within one layer of the charge transfer complex cathode and wherein a second layer of the charge transfer complex cathode does not contain the electronic conductor.

In a solid electrolyte cell comprising an anode, the layered charge transfer complex cathode and a solid electrolyte disposed between and in contact with the anode and layered charge transfer complex cathode, the electronic conductor-containing layer of the cathode is isolated from the solid electrolyte by a thin layer of the cathode that does not contain the electronic conductor so as to effectively prevent the electronic conductor from making direct physical contact with the anode. Basically, the layer of the cathode disposed in contact with the solid electrolyte consists of the reaction product of at least one halogen with an organic compound while the second layer of the cathode that is isolated from the solid electrolyte comprises the reaction product of at least one halogen with an organic compound along with an electronic conductor. The two layers need not be of the same charge transfer complex. For most applications, the thin layer of the cathode that does not contain the electronic conductor may vary on the low side between about 0.001 inch to 0.003 inch thick and on the high side up to about 15% of the thickness of the electronic conductor-containing layer.

Electronically conductive additives suitable for use in this invention include carbon, graphite and metals which are chemically inert in the cell environment. The amount of the electronic conductor to be added can vary depending on the particular cathode material and conductivity of the cathode required for the particular cell system. Generally between about 2% and 8% by weight of the cathode layer would be a suitable amount for most applications.

As used herein, at least one halogen shall mean a halogen such as iodine, bromine, chlorine or fluorine, a mixture of two or more halogens or a compound (interhalogen) of two or more halogens.

Suitable organic compounds for use in this invention would include poly(N-vinylpyrrolidone), poly-2-vinylpyridine, anthracene, naphthalene, mesophase pitch as disclosed in U.S. Pat. Nos. 4,005,183, 4,017,327 and 4,026,788 and other heterocyclic and polynuclear aromatic entities. The above three United States patents are incorporated herein by reference.

Anode materials suitable for use with the cathodes of this invention include lithium, silver, sodium potassium, rubidium, magnesium and calcium. The preferred anode material is lithium.

Solid electrolytes for use in this invention would include lithium iodide, silver iodide, silver bromide, lithium bromide, tetrasilver rubidium pentaiodide, lithium aluminum tetrachloride, tetrasilver potassium tetraiodide cyanide, tetrasilver rubidium tetraiodide cyanide, sodium iodide and sodium bromide. The preferred solid electrolytes for use in this invention are lithium iodide and tetrasilver potassium tetraiodide cyanide.

Preferable cell systems using the layered cathode of this invention would be as follows:

| Anode | Electrolyte |
|---|---|
| lithium | lithium iodide |
| lithium | lithium bromide |
| silver | silver iodide |
| silver | tetrasilver potassium tetraiodide cyanide |
| silver | tetrasilver rubidium tetraiodide cyanide |

DRAWINGS

EXAMPLE 1

A 0.457-inch diameter button cell was constructed as follows. A layered cathode was prepared having a first layer comprising 0.417 gram of a mix consisting of 0.4056 gram of mesophase pitch.$8I_2$ and 0.0114 gram carbon. The mesophase pitch contained about 85 percent mesophase and was blended with iodine in a weight ratio of 6 percent mesophase resin and 94 percent iodine. The mixture along with the carbon was reacted to form charge transfer complexes as disclosed in U.S. patent application Ser. No. 052,846, said application being incorporated herein by reference. The second layer of the cathode contained only 0.1188 gram of the mesophase pitch.$8I_2$ complex. The layered cathode and a lithium anode were assembled in a nickel-plated cold-rolled steel container with the second layer (not containing the carbon) positioned next to the anode. A cover along with a gasket was placed on top of the container and sealed in a conventional manner. The electrolyte, lithium iodide, was formed in situ by the reaction of the lithium in the anode and the iodine in the cathode. Polarization data was taken for the cell and the results are plotted as a curve in FIG. 1. As evident from the data, the layered cathode was capable of delivering currents up to 800 $\mu A/cm^2$ above 2.5 volts.

EXAMPLE 2

A 0.90 inch diameter cell was constructed as described in Example 1 using a similar layered charge transfer complex cathode. The cell was discharged across a 200,000-ohm load at 45° C. and the voltage observed is plotted in FIG. 2.

Figure 1:
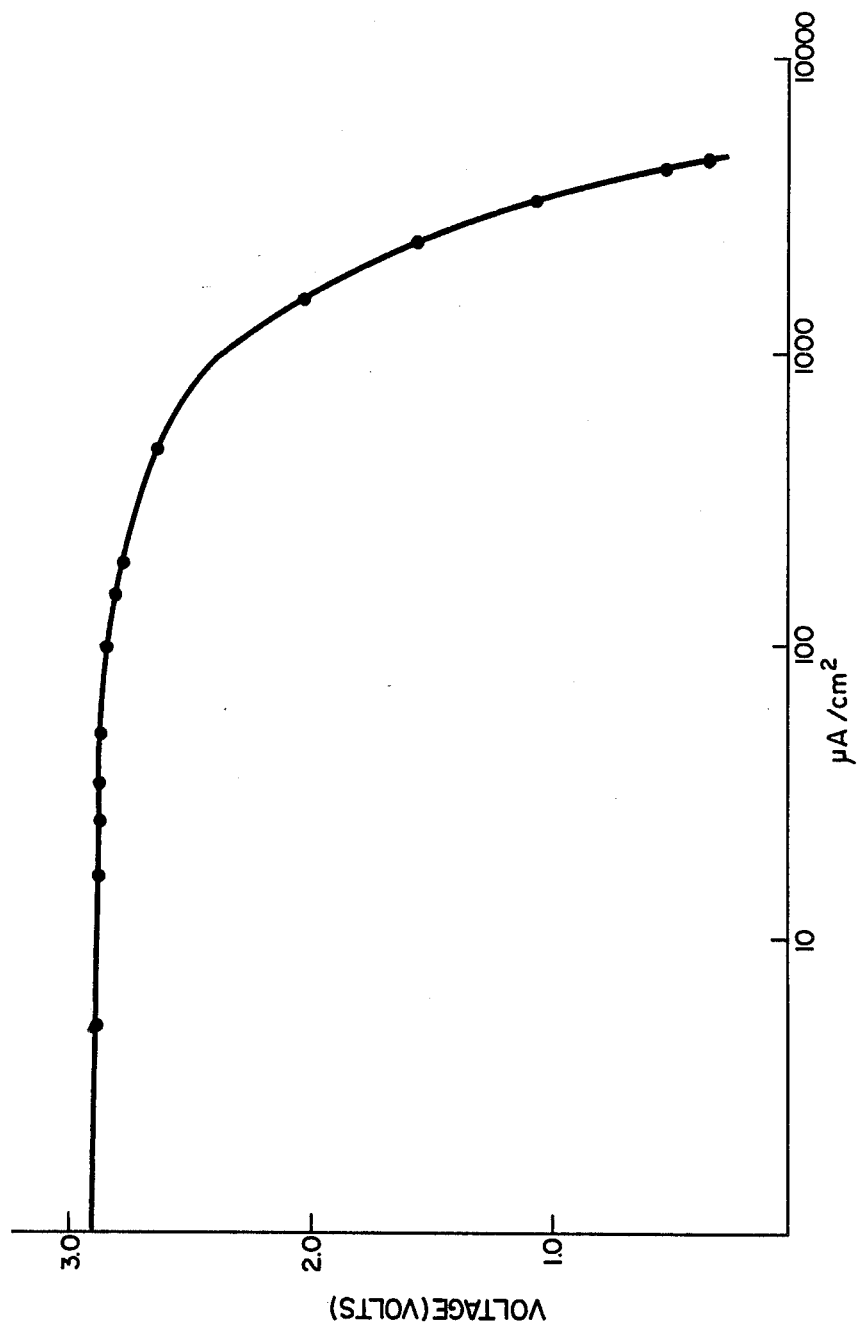
FIG. 1 is a plot of polarization data taken for the cell of Example 1.
Figure 2:
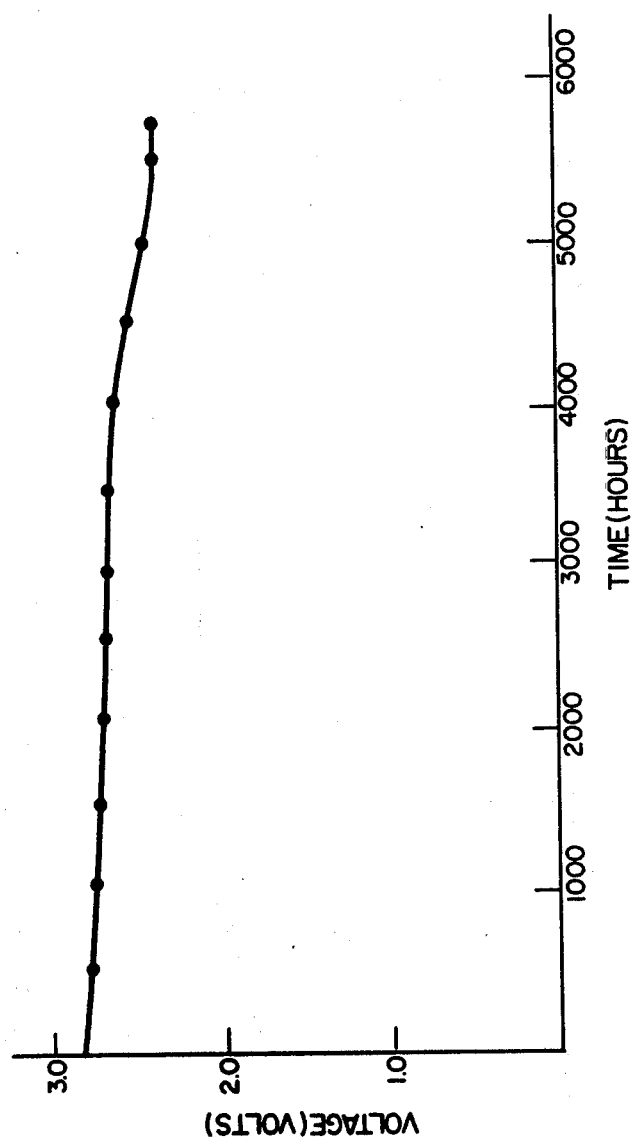
FIG. 2 is a plot of discharge data taken for the cell of Example 2.

The data presented in FIGS. 1 and 2 clearly demonstrate that the layered cathode of this invention is admirably suited for use in solid electrolyte cell systems.

It should be understood that the foregoing disclosure relates to preferred embodiments of the invention and it is intended to cover all changes and modifications of the invention which do not depart from the spirit and scope of the appended claims.

What is claimed is:

1. A layered cathode for use in solid electrolyte cell systems comprising a charge transfer complex in which the complex is the reaction product of at least one halogen (acceptor) with an organic compound (donor) and wherein an electronic conductor is dispersed within one layer of the charge transfer complex cathode and wherein a second layer of the charge transfer complex cathode does not contain the electronic conductor.

2. The layered cathode of claim 1 wherein the electronic conductor is selected from the group consisting of carbon, graphite and inert metals.

3. The layered cathode of claim 1 wherein the at least one halogen is selected from the group consisting of iodine, bromine, chlorine, fluorine, mixtures thereof and compounds (interhalogens) thereof.

4. The layered cathode of claim 1 wherein the organic compound is selected from the group consisting of anthracene, naphthalene, poly(N-vinylpyrrolidone), poly-2-vinylpyridine, mesophase pitch and heterocyclic and polynuclear aromatic entities.

5. The layered cathode of claim 1 for use in a solid electrolyte cell system employing an anode selected from the group consisting of lithium, silver, sodium, potassium, rubidium, magnesium and calcium.

6. The layered cathode of claim 1 wherein the cathode is a charge transfer complex selected from the group consisting of lithium iodide, silver iodide, silver bromide, lithium bromide, tetrasilver rubidium pentaiodide, lithium aluminum tetrachloride, tetrasilver potassium tetraiodide cyanide, tetrasilver rubidium tetraiodide cyanide, sodium iodide and sodium bromide.

7. The layered cathode of claim 1 for use in solid electrolyte cell systems wherein the anode is lithium, the electrolyte is lithium iodide and the cathode is a charge transfer complex of iodine and an organic compound.

8. The layered cathode of claim 1 wherein the organic compound is mesophase pitch.

9. The layered cathode of claim 1, 2, 3, 4, 5, 6, 7 or 8 wherein the thickness of the second layer varies between about 0.001 inch up to about 15% of the thickness of the layer containing the electronic conductor.

10. The layered cathode of claim 1, 2, 3, 4, 5, 6, 7 or 8 wherein the electronic conductor is present in the electronic conductor-containing layer between about 2% and 18% by weight of the layer.

11. A solid electrolyte cell employing the layered charge transfer complex cathode of claim 1, 2, 3, 4, 5, 6 or 7, an anode and a solid electrolyte disposed between and in contact with the anode and layered charge transfer complex cathode, and wherein the electronic conductor-containing layer of the cathode is isolated from the solid electrolyte by a thin layer of the cathode that does not contain the electronic conductor so as to effectively prevent the electronic conductor from making direct physical contact with the anode.

12. The solid electrolyte cell of claim 11 wherein the thin layer varies in thickness between about 0.001 inch up to about 15% of the thickness of the layer containing the electronic conductor.

13. The solid electrolyte cell of claim 11 wherein the electronic conductor is present in the electronic conductor containing-layer between about 2% and 8% by weight of the layer.

* * * * *

UNITED STATES PATENT AND TRADEMARK OFFICE
CERTIFICATE OF CORRECTION

PATENT NO. : 4,267,244
DATED : May 12, 1981
INVENTOR(S) : Demetrios V. Louzos

It is certified that error appears in the above—identified patent and that said Letters Patent is hereby corrected as shown below:

Column 4, lines 53-54 (claim 6) after the words "claim 1" delete "wherein the cathode is a charge transfer complex" and substitute therefore --for use in a solid electrolyte cell system wherein the solid electrolyte is--.

Signed and Sealed this

Twenty-eighth Day of June 1983

[SEAL]

Attest:

GERALD J. MOSSINGHOFF

Attesting Officer

Commissioner of Patents and Trademarks